United States Patent [19]
Milligan

[11] Patent Number: 5,496,069
[45] Date of Patent: Mar. 5, 1996

[54] HEAT MANAGEMENT SHIELDING DEVICE

[76] Inventor: Frank Milligan, 2009 Wyecroft Road, Oakville, Ontario, Canada, L6L 6J4

[21] Appl. No.: 764,509

[22] Filed: Sep. 20, 1991

[51] Int. Cl.[6] ........................................ B60P 3/22
[52] U.S. Cl. ...................... 280/830; 280/832; 280/770; 252/62
[58] Field of Search ........................ 280/830, 832, 280/834, 770; 180/69.4, 309, 89.2, 296; 60/320; 252/62

[56] References Cited

U.S. PATENT DOCUMENTS

| | | | |
|---|---|---|---|
| 3,007,596 | 11/1961 | Matsch | 252/62 |
| 3,151,365 | 10/1964 | Glaser et al. | 252/62 |
| 3,410,443 | 11/1968 | Hofmann | 252/62 |
| 3,863,445 | 2/1975 | Heath | 60/299 |
| 3,958,582 | 5/1976 | Noda et al. | 252/62 |
| 3,963,087 | 6/1976 | Grosseau | 180/309 |
| 3,991,254 | 11/1976 | Takeuchi | 252/62 |
| 4,085,816 | 4/1978 | Amagai et al. | 180/89.2 |
| 4,455,246 | 6/1984 | Schmidt et al. | 252/62 |
| 4,895,268 | 1/1990 | Hyde | 220/694 |
| 4,909,530 | 3/1990 | Tsukada et al. | 180/296 |
| 4,930,811 | 6/1990 | Tsukada et al. | 280/834 |

FOREIGN PATENT DOCUMENTS

| | | |
|---|---|---|
| 288587 | 11/1988 | European Pat. Off. . |
| 2340257 | 2/1975 | Germany . |
| 3701723 | 8/1988 | Germany . |
| 57-140226 | 8/1982 | Japan . |
| 57-201721 | 12/1982 | Japan . |

*Primary Examiner*—Richard M. Camby
*Attorney, Agent, or Firm*—Neil H. Hughes; Ivor M. Hughes

[57] ABSTRACT

A composite protective shield installed with a vehicle for protecting, occupants of the vehicle, and/or a destructible or volatile apparatus affected by the elements, the composite shield comprising mounting means to mount the shield adjacent the occupant and/or destructible or volatile apparatus, the shield being formed from a resilient matrix providing the form thereof, such as sheet molding compound, the resilient matrix having predetermined heat distortion properties and abrasive resistance properties to provide maximum shielding for the particular use, the resilient matrix of the shield being provided with a heat management system adjacent the occupants of the vehicle and or the destructible or volatile apparatus, the heat management system to dissipate the heat on the side of the shield to which heat may be applied thus maintaining the occupant and or the destructible or volatile apparatus harmless and safe.

16 Claims, 6 Drawing Sheets

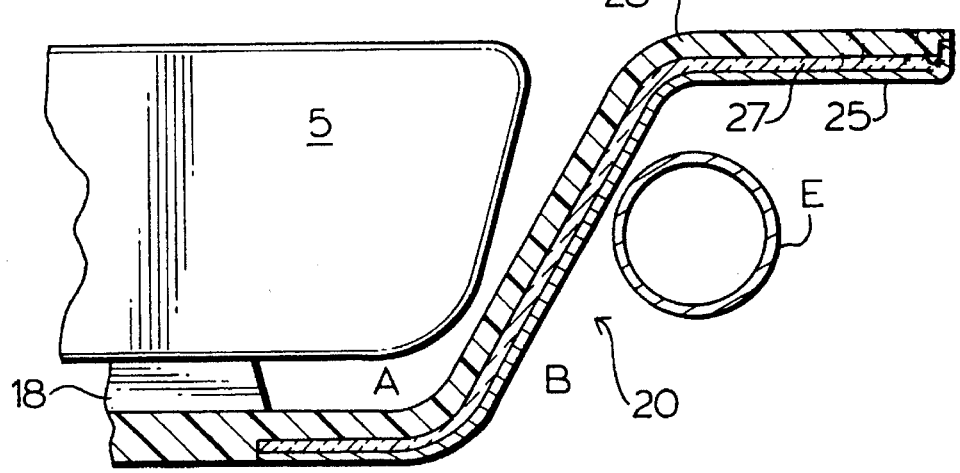
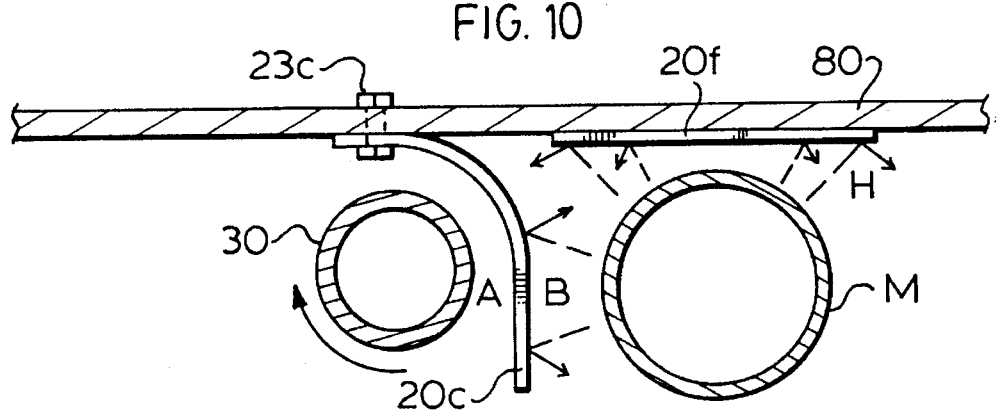
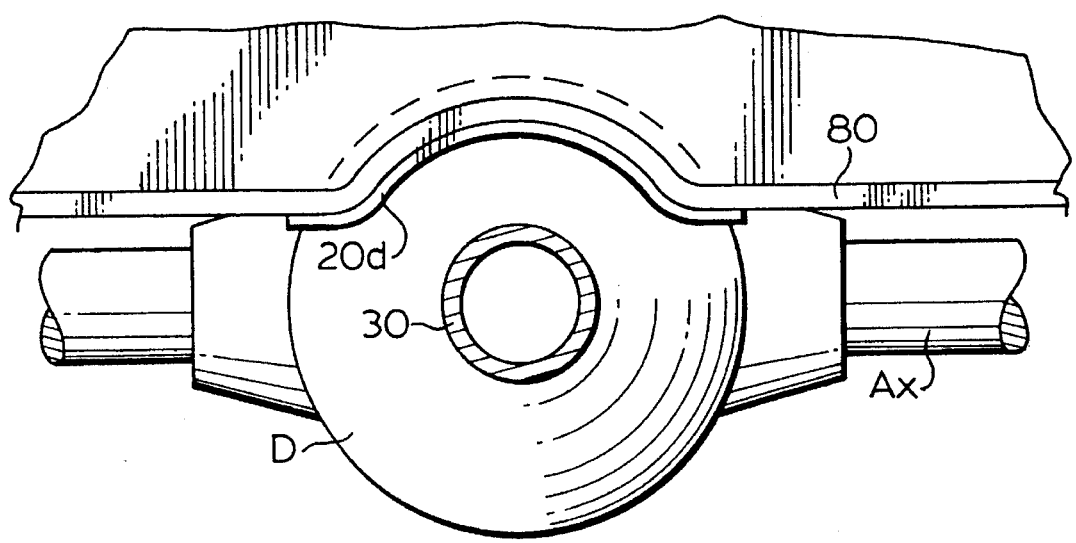

HEAT MANAGEMENT SHIELDING DEVICE

FIELD OF INVENTION

This invention relates to heat shields and more specifically to heat shields which are found within motor vehicles or the like. A further attribute of the heat shield of the instant invention is its ability to withstand stones thrown up from the road.

BACKGROUND OF THE INVENTION

It has long been the practice to shield heat sources for the danger they may cause to equipment or the occupant of motor vehicles. For example, catalytic converters are shielded because of the high temperatures generated within the converter. Further sections of exhaust pipe are shielded to protect operators of motorcycles.

Fuel tanks have been shielded with various structures known in the prior art. Most of the structures known are metal plates of various forms which cover the fuel tank and may provide an air gap between the outside of the fuel tank and the shield. The benefits of this shield are particularly attractive for plastic gas tanks which have a lower melting point than metal. It is considered beneficial in the prior art to keep any potential flame away from the gas tank by providing a metal shield.

Heretofore, a number of such shielding devices are known in the prior art. A Japanese publication 57-201,721 to Nippon Oil KK describes for use with a banded fuel tank sheets of unvulcanised rubber including an inorganic filler disposed between the vehicle body and fuel tank for its excellent water resistance, durability and self-fire extinguishing properties.

European patent 288,587 assigned to Rhein-Conti-Kunst describes a multi layered tank for motor fuel made of at least two layers of plastic not firmly joined together and having there between a small air gap or insulating layer. The outer layer of plastic has high impact strength and toughness.

West German publication 2,340,257 describes a fuel tank mounted under the floor of a vehicle which has asbestos cladding on the side near the exhaust pipe. The underside of the tank is protected by metal cladding fitted to the tank during molding. The cladding is held at a space from the tank wall for extra protection.

Japanese publication 57-140,226 assigned to the Honda Motor Company describes a fuel tank main body covered by a heat resistant material with the outside of the heat resistant material covered by a heat reflecting shielding film. When the tank is heated to the heat resisting temperature or above, the heat insulating material constituting the outer layer of the main body is carbonized to form a carbonized layer at the outside surface of the main body.

U.S. Pat. No. 4,895,268 to Ford discloses a plastic fuel tank which has a integral shield mounted thereto. U.S. Pat. No. 4,909,530 describes a flame cut off plate disposed between an exhaust pipe and the side wall of the fuel tank. U.S. Pat. No. 4,930,811 describes a flame cutoff plate disposed between an exhaust pipe and side wall of the fuel tank. These three references assigned to the Ford Motor Company, Fuji Jukogyo Kabushiki Kaisha, and Fuji Jukogyo Kabushiki Kaisha respectively describe the use of a metal plate shield.

Other examples of metal shields are found in U.S. Pat. Nos. 3,963,087, 3,863,445 and 4,085,816 which represent various forms that heat shields may take. West German publication 3,701,723 describes an impact guard to protect a car fuel tank including a sheet metal dish closed on the side facing the fuel tank offering protection from collision.

Nowhere within the prior art known to applicant is there found a composite heat shield for use in conjunction with a heat sensitive device to protect the device from a heat source which may tend to damage or destroy the device during periods of extreme heat generation. Such a heat shield would prevent the majority of heat passing across to the heat sensitive device and would minimize the effect of direct flame thereupon.

Most of the prior art heat shields are made up of metal cladding which is expensive to manufacture and difficult to form into required shapes. Metal is also an excellent conductor of heat and although such a heat shield may be provided with insulation or be set at a gap from, for example, the fuel tank, the heat managing properties of such a shield may not be sufficient to prevent the heat adjacent the plastic fuel tank from rising to within a critical zone of its melting temperature.

It is therefore a object of this invention to provide a heat shield which is light, economical, and effective.

It is a further object of this invention to provide a heat shield which is molded from sheet molding compound which is resistant to roadwear and has a portion of the sheet molding compound covered with reflecting metal cladding having disposed between the sheet molding compound and the cladding high temperature resistant insulation for the portion of the shield which is coextensive with a heat source in use.

Further and other objects of the invention will become apparent to those skilled in the art when considering the following summary of the invention and the more detailed description of the preferred embodiments illustrated herein.

SUMMARY OF THE INVENTION

According to one aspect of the invention there is provided a composite protective shield installed with a vehicle for protecting occupants of the vehicle (when the shield is an integral part of the floor pan or fire wall) and/or a destructible or volatile apparatus (such as a fuel tank, muffler or catalytic converter) affected by the elements, (for example abrasive road wear and heat), the composite shield comprising mounting means to mount the shield adjacent the occupant and/or destructible or volatile apparatus, (preferably mounted at a gap therefrom which may be an air gap or said gap may be filled with insulation), the shield being formed from a resilient matrix providing the form thereof, such as sheet molding compound (preferably flame retardant phenolic or polyester glass fibre resin) and preferably formed by compression molding, preferably the sheet molding compound having predetermined heat distortion properties and abrasive resistance properties to provide maximum shielding for the particular use, the resilient matrix of the shield being provided with a heat management system adjacent the occupants of the; vehicle and or the destructible or volatile apparatus, the heat management system to dissipate the heat on the side of the shield to which heat may be applied thus maintaining the occupant and or the destructible or volatile apparatus harmless and safe (preferably the heat management system further comprising a layer of reflective material (preferably aluminum) fastened with the matrix, the matrix and the reflective material having therebetween disposed insulating material having low thermal conductivity and low heat storage capability (such as ceramic wool, or rock wool).

According to another aspect of the invention there is provided a composite protective shield installed with a vehicle for protecting a destructible or volatile apparatus (such as a fuel tank) affected by the elements, (for example abrasive road wear and heat), the composite shield comprising mounting means to mount the shield adjacent the destructible or volatile apparatus, (preferably mounted at a gap therefrom which may be an air gap or said gap may be filled with insulation), the shield being formed from a resilient matrix providing the form thereof, such as sheet molding compound (preferably flame retardant phenolic or polyester glass fibre resin) and preferably formed by compression molding, preferably the sheet molding compound having predetermined heat distortion properties and abrasive resistance properties to provide maximum shielding for the particular use, the resilient matrix of the shield being provided with a layer of reflective material (preferably aluminum) fastened with the matrix, the matrix and the reflective material having therebetween disposed insulating material having low thermal conductivity and low heat storage capability (such as ceramic wool, or rock wool) adjacent the destructible or volatile apparatus, the layer of reflective material and the insulation to dissipate the heat on the side of the shield to which heat may be applied thus maintaining the destructible or volatile apparatus harmless and safe.

According to yet another aspect of the invention there is provided a composite protective shield installed with a vehicle for protecting a fuel tank affected by the elements, (for example abrasive road wear and heat), the composite shield comprising mounting means to mount the shield adjacent the fuel tank mounted at a gap therefrom which may be an air gap or said gap may be filled with insulation, the shield being formed from a resilient matrix providing the form thereof, such as sheet molding compound (preferably flame retardant phenolic or polyester glass fibre resin) and formed by compression molding, preferably the sheet molding compound having predetermined heat distortion properties and abrasive resistance properties to provide maximum shielding for the particular use, the resilient matrix of the shield being provided with a layer of reflective material (preferably aluminum) fastened with the matrix, the matrix and the reflective material having therebetween disposed insulating material having low thermal conductivity and low heat storage capability (such as ceramic wool, or rock wool) adjacent the fuel tank, the layer of reflective material and the insulation to dissipate the heat on the side of the shield to which heat may be applied thus maintaining the fuel tank harmless and safe.

BRIEF DESCRIPTION OF THE DRAWINGS

The invention will now be illustrated with respect to the following drawings illustrating embodiments of the invention in which:

FIG. 9 is a schematic view of the protection offered by the heat management system of the instant invention illustrated in a preferred embodiment of the invention.

FIG. 10 is illustrated in an alternative embodiment of the invention for protecting composite drive shafts.

FIG. 11 is an alternative embodiment of the invention illustrating a heat management device protecting a composite floor pan 80 from the heat generated by a differential and illustrated in an alternative embodiment of the invention.

DETAILED DESCRIPTION OF PREFERRED EMBODIMENTS OF THE INVENTION

Figure 1:
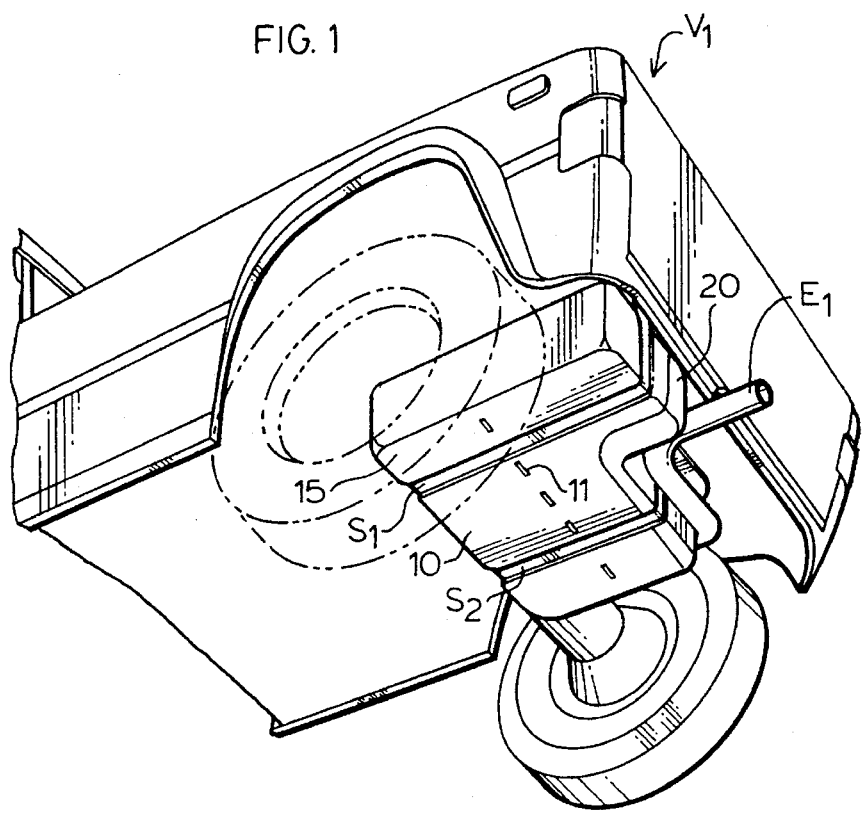
FIG. 1 is a partial perspective view of a heat shield for a fuel tank installed in a vehicle and illustrated in a preferred embodiment of the invention.
Figure 2:
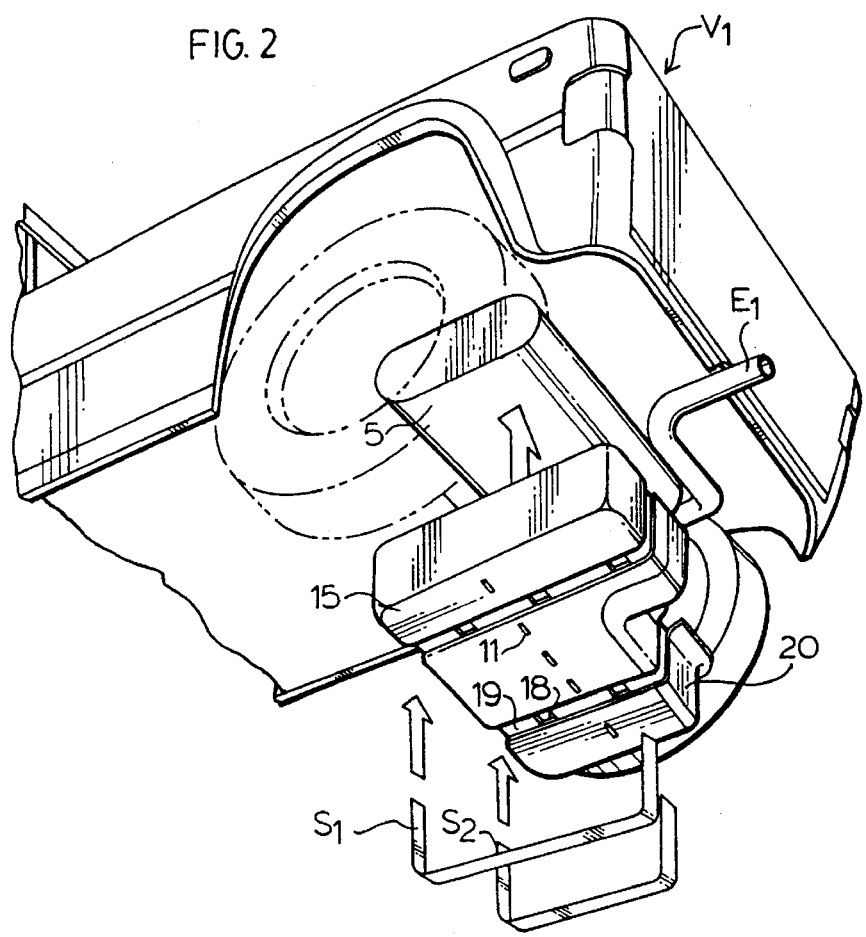
FIG. 2 is a partially exploded perspective view of the device of FIG. 1 illustrated in a preferred embodiment of the invention.
Figure 8:
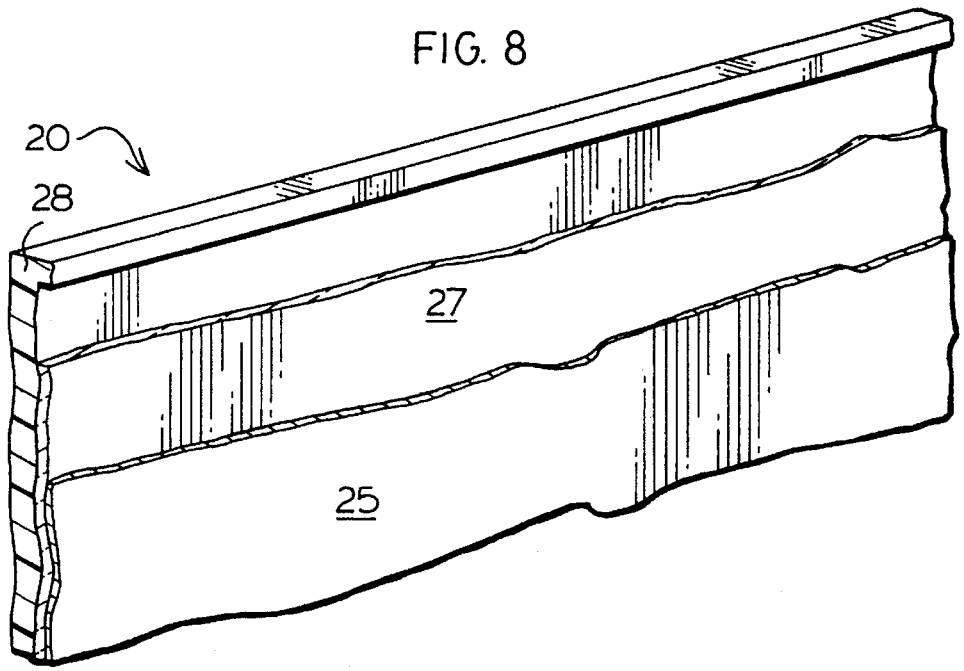
FIG. 8 is a cutaway schematic view of the portion of the shield of FIG. 1 having the heat management zone formed therewith and illustrated in a preferred embodiment of the invention.

Referring now to FIG. 1 and FIG. 2 there is illustrated in perspective Vehicle V1 having disposed at the bottom thereof a fuel 5 tank 5 which is shielded from both road gravel and the heat of the exhaust pipe E1 by a composite shield 10 which provides both road wear protection for the fuel tank 5 by portion 15 of the shield tank made from a resilient material such as sheet molding compound which will be described hereinafter. The zone 20 of the shield 10 adjacent the exhaust pipe E1 has fixed to the sheet molding compound portion forming the matrix, an aluminum reflecting layer 25 as best seen in FIG. 8, which reflects much of the surrounding heat passing through the exhaust E1. Disposed between the matrix sheet molding compound layer 15 and the aluminum layer 25 is an insulating layer of ceramic wool, the benefits of which will be described hereinafter.

The shield 10 therefore is affixed beneath the compatibly shaped gas tank which is molded from high density polyethylene which typically has a melting point of approximately 250° F. Since the temperatures adjacent the exhaust E1 can exceed the melting point of the fuel tank it is important therefore to provide in the zone adjacent the exhaust E1 a heat shield portion 20 of the composite shield 10.

Figure 6:
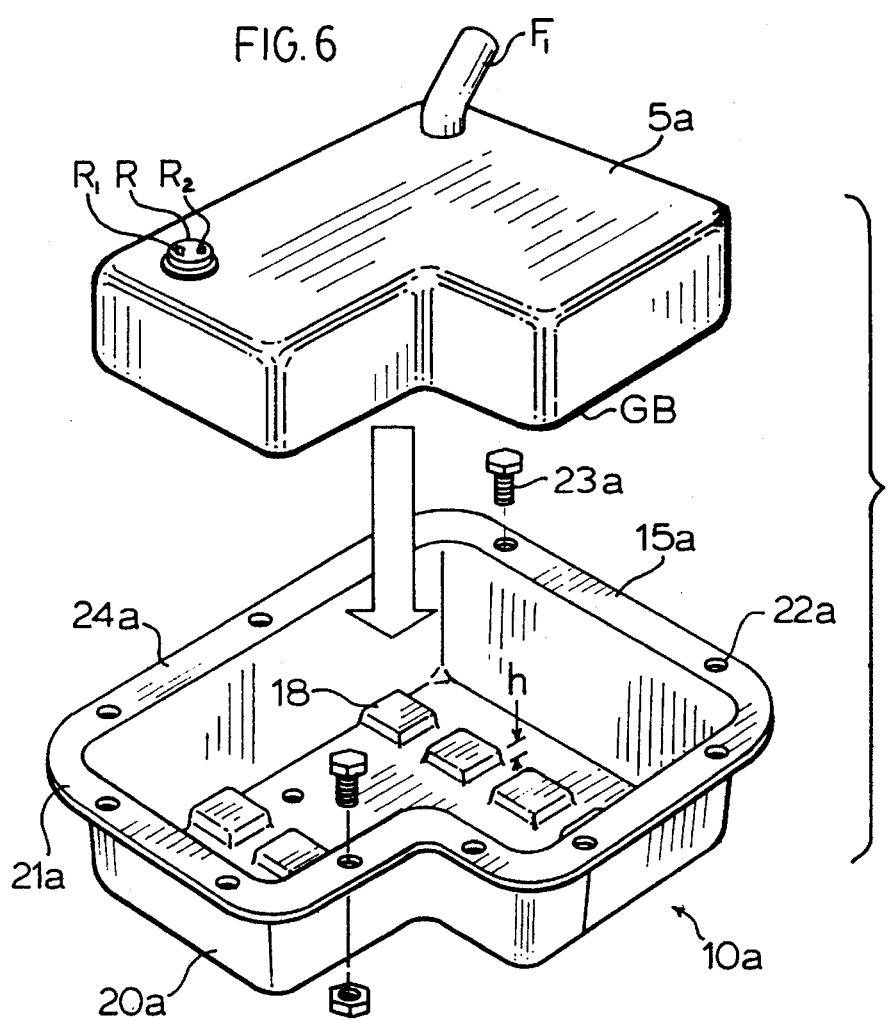
FIG. 6 is a perspective view of the shield of FIG. 1 and its interfit with a fuel tank and illustrated in a preferred embodiment of the invention.
Figure 7:
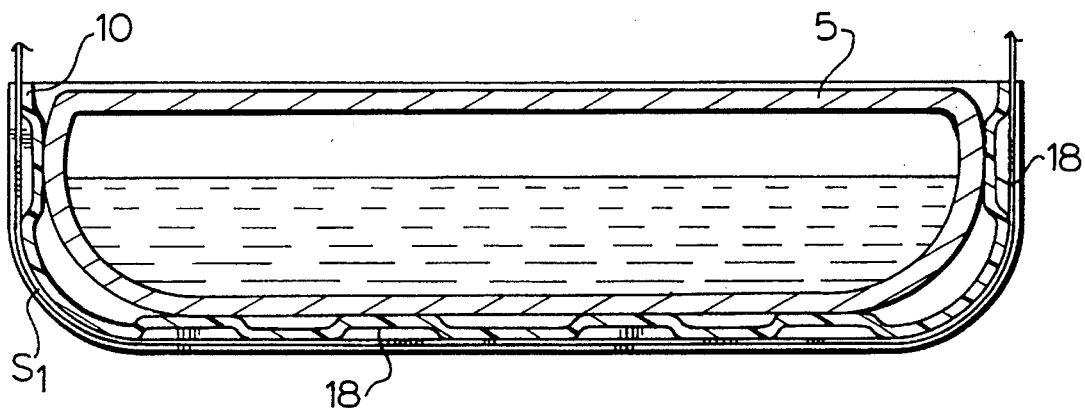
FIG. 7 is a cross sectional view of the tank and shield of FIG. 6 taken across the spacing members 18 illustrated in a preferred embodiment of the invention.

The matrix of the composite shield 10 is formed from sheet molding compound which is a thermoset material having good heat properties and which demonstrates resilience for abrasive road wear, such as gravel. The matrix is a flame retardant phenolic or polyester glass fiber resin which is compression molded to form the appropriate shape. In the mold the necessary attributes of the shield are formed such as the slots 11 which are drain holes to allow for the passage of moisture, and the channels 19 which allow for the fastening of the shield via straps S1 and S2 underneath the vehicle by conventional methods. Formed with the shield 10 are raised portions 18 as best seen in FIG. 6 and 7 which support the gas tank at predetermined locations and establish an air gap of approximately ⅜" around the circumference of the gas tank 5 adjacent the shield 10. Therefore, the air gap in conjunction with the aluminized zone 20 of shield 10 having disposed between said aluminized zone and the matrix 10 an insulating layer of ceramic wool thus provides a heat management ability to locate the aluminized zone 20 adjacent a heat source such as the exhaust E1 or the like and thereby provide in a singular composite shield the ability to withstand road wear as well as the provision of providing a heat management zone 20 for said shield 10.

Ceramic wool and specifically Kaolin wool manufactured by Babcock and Wilcox (Kaolin wool is a registered trademark) is a alumina-silica fire clay which melts at approximately 3200° F. with a useful limit of 2300° F. The ceramic wool is made of fibres which are interlaced and thus provide additional strength.. In the preferred embodiment a ⅛" thick layer of Kaolin wool is provided which has a density of 12 lbs per cubic foot. The ceramic wool is considered superior to any of the other wools, such as rock wool, for its low thermal conductivity and low heat storage abilities. Rock wool, however, or the like will provide a measure of the benefits of the instant invention but ceramic wool is recommended.

The sheet molding compound used to form the matrix 15 of the composite shield 10 is manufactured by Jet Molding Compounds Limited of Ajax, Ontario, Canada and is made from 22% glass. It has an average burn rate of 0.31" per minute, which is considered low, and has a heat distortion temperature of 400° F. at 264 psi. An alternative material may be considered as Taffen manufactured by Exxon.

The aluminum used in the preferred embodiment is manufactured by Reynolds which is an alloy #3003-H16 entitled Alclad Alloy, which is resistant to salt spray. It has an ultimate strength of 26 ksi, a 25 ksi yield, an ultimate sheer strength of 15 ksi and an elongation of 5% and 14% for a ¹⁄₁₆" and a ½" specimen respectively. The modulous of elasticity is 10,000 ksi. Of course other alternative equivalents may be used providing they closely realize the benefits described hereinafter.

By providing a heat management zone at the aluminized zone 20 of the shield 10 and setting the shield 10 at a predetermined gap from the fuel tank 5 as seen in FIG. 6 and by providing the matrix from a material as described above which has a heat distortion temperature of 400° F., which is above the melting point of the fuel tank and by providing a zone 20 formed with the composite shield 10 which has heat management properties because of the reflecting ability of the aluminum 25 and the insulation value of the ceramic wool 27, the combination of the reflecting properties of the aluminum alloy 25 and the ceramic wool 27 provided superior results in conducting flame tests upon the heat shield portion 20 of shield 10. A flame was applied to the heat shield portion 20 of the shield 10 at a temperature of 900° F. for approximately 1 hour. The temperature was measured at the gas tank and found to be well below its 250° F. melting temperature. In fact, the test results measured at approximately 180° F. It is felt that the reflecting property of the aluminum and the superior insulating value of the ceramic wool in combination with the higher heat distortion temperature of the sheet molding compound in combination with the air gap provided between the shield and the gas tank over most of its surface area resulted in this superior performance.

Figure 3:
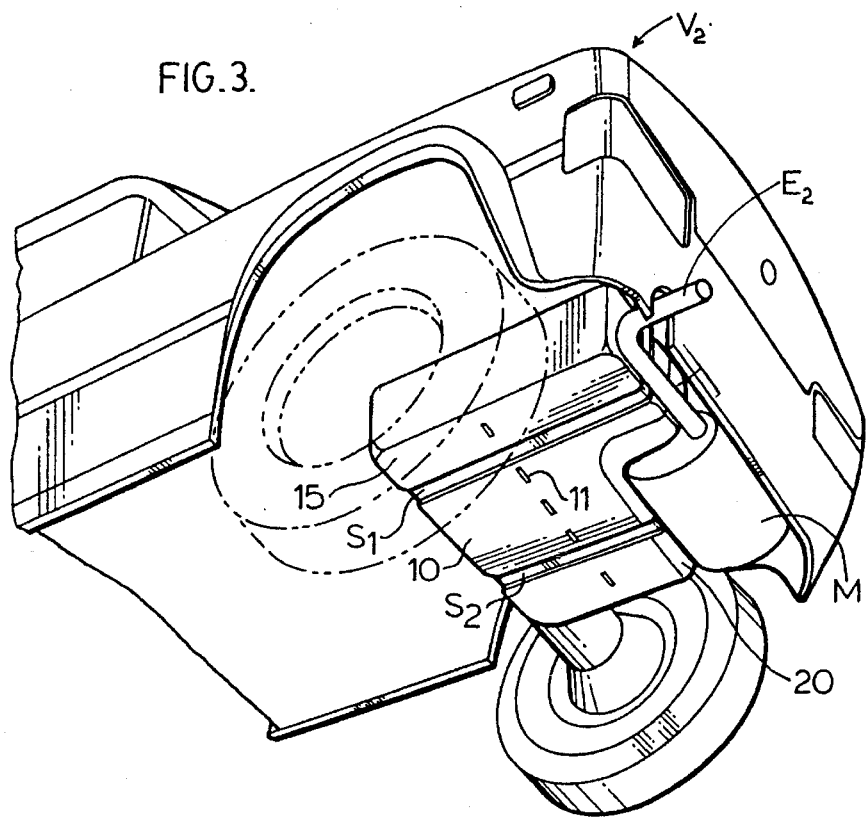
FIG. 3 is identical to FIG. 1 illustrating an alternative embodiment of the invention.
Figure 4:
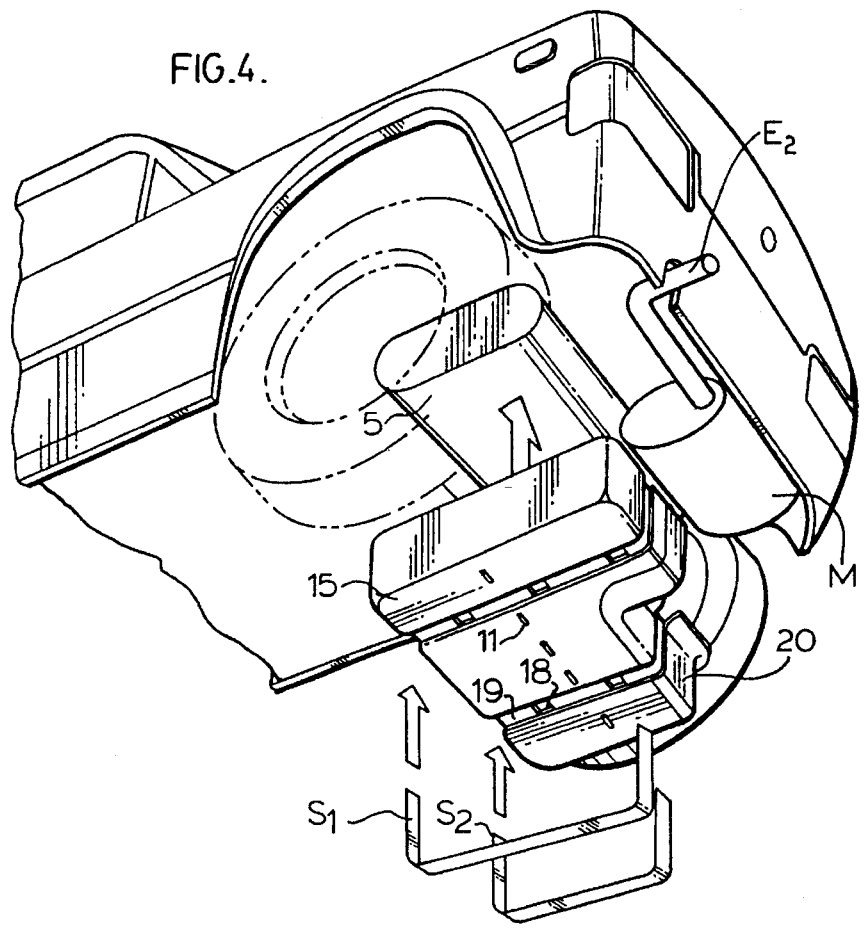
FIG. 4 is a partially exploded perspective view of FIG. 3 illustrated in an alternative embodiment of the invention.

Referring now to FIG. 3, there is illustrated an alternative use for the shield 10 of FIG. 1 which is identically structured to that shown in FIG. 1 with the exception that an additional portion of the surface area of the shield 10 is covered with the heat management system of FIG. 8 to provide protection for the plastic gas tank 5 from both the muffler M and the Exhaust E2. The properties and performance of the heat shielded zone are identical.

Referring now to FIG. 6 there is illustrated in perspective the gas tank 5 and the heat shield 10a of FIG. 1 illustrating clearly the raised portion 18 which establishes the air gap between the shield 10a and the gas tank 5a. The gas tank as is known has a filling spout F1 and openings R1 and R2 and plug R4 for the passage of tubes which extends to charcoal filters and the carburetor. Since this has no bearing on the invention, no further description will be provided. The matrix 15a is covered in the heat management zone 20a including the flanges 21a by the aluminum alloy described above and the ceramic wool as best seen in FIG. 8. The shield 10a however is affixed directly to the vehicle via fasteners 23a thus eliminating the straps S1 and S2 and the channels 19 shown in FIGS. 1 through 4. All other advantages are the same.

Figure 5:
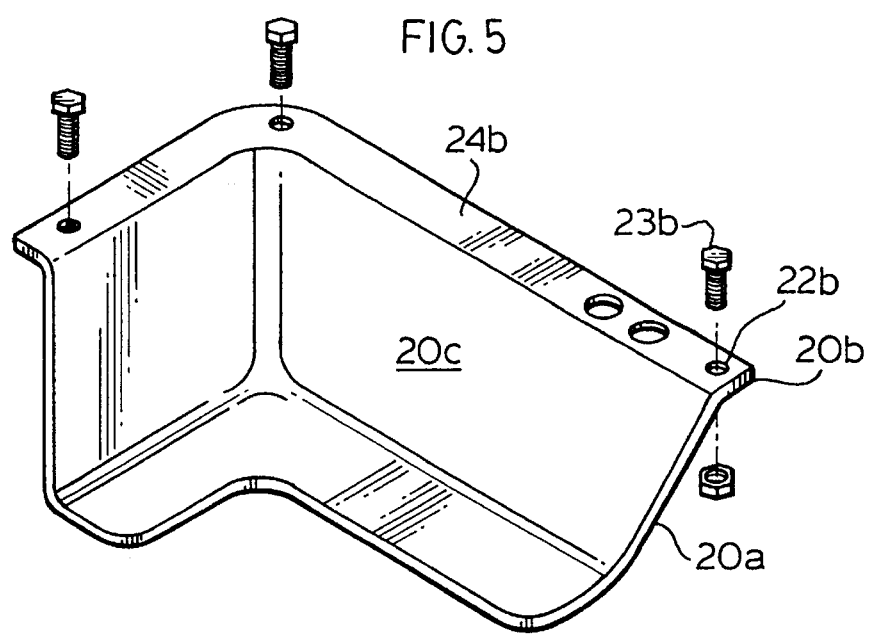
FIGS. 5 is a perspective view of a partial shield embodying the invention and illustrated in an alternative embodiment.

Referring to FIG. 5 identically formed heat shield 20b is illustrated which is entirely covered with the heat management system described above and which only covers a portion of the tank adjacent the exhaust system for a fuel tank. Therefore no road wear shield is provided by the heat shield 20b which takes advantage of only the heat management properties of the instant invention. The fasteners 23b are provided with security flangers 24b via holes 22b to the bottom of a vehicle. Although the structure of FIG. 5 is an alternative to the heat shields of FIG. 1 through 4 it is not recommended unless other shielding is provided for the gas tank. The inside 20i of the shield 20b is formed from the matrix of sheet molding compound described above and the exterior 20o is covered with the heat management systems substantially as seen in FIG. 8.

Referring now to FIG. 7 there is described the composite shield 10 of FIG. 1 shown in cross section along the channels 19 which illustrates the air gap defined by the raised portions 18 over a substantial portion of the fuel tank 5. This air gap which is not labelled provides additional benefits for retarding the passage of heat to the fuel tank and maintaining the temperature at the fuel tank below the melting temperature even at the extreme case of exposing the heat management zone 20 of the shield 10 of FIG. 1 to temperatures of approximately 900° F.

Referring to FIG. 8 there is shown in cross section cut away the layers of sheet molding compound 28, ceramic wool 27, and aluminum alloy 25 comprising the heat management zone for the heat shield portion 20 of the composite shield 10. The shield of FIG. 5 is formed entirely from the components of FIG. 8 with no portion of the matrix 28 being uncovered. The ceramic wool comes in blankets which may be affixed to the sheet molding compound matrix by adhesive or other like bonding products after the sheet molding compound is formed in the compression mold. The aluminum alloy is then fixed to the exterior of the ceramic wool 27. The aluminum alloy is chosen because it is lightweight, inexpensive and easy to form. Other metals having similar reflecting properties may perform equally well but aluminum is preferred for economical reasons.

Referring to FIG. 9 there is illustrated in schematic view an exhaust pipe E whose heat is shielded from gas tank 5 by the air gap on side A of the heat management zone 20 of the shield 10. The gap as previously mentioned is defined by the raised portion 18. The exhaust pipe is set at a gap as well from the aluminum surface 25 which has disposed beneath a layer of ceramic wool which is ⅛" thick. Therefore, FIG. 9 provides the typical description of a shield having a heat management zone which may be used for many alternative embodiments of the invention to protect a device such as gas tank 5 which is susceptible to heat from a heat source, such as exhaust E, by providing a matrix of sheet molding compound which has good heat distortion properties and in this case, 400° F. at 264 psi, which has an outer covering of material having heat reflecting; properties such as aluminum. The shield has disposed between the matrix and the reflecting layer an insulating layer which has ultra low thermal conductivity and low heat storage abilities. In providing such a structure an open flame which may be caused from gas vapours passing through the exhaust E potentially passing through a puncture hole in the exhaust on the side thereof to expose a portion of the shield to a flame of approximately 900° F.

FIGS. 10 and 11 illustrate alternative shields 20c and 20d which are provided and formed identically in purpose to the structure of FIG. 9 to protect in the case of FIG. 10 a composite drive shaft 30 formed from non-metallic materials from the heat generated from a muffler M on side B of the shield. The shield 20c is formed identically with that described in relation to FIG. 9 and therefore provides a predetermined measure of safety for the composite drive shaft 30 on side A of the heat shield. The heat shield 20c is fastened to the bottom of the vehicle at fastener 23c a shield 20f may also be provided above the muffler M so that the heat H reflects away from the floor pan 80. In FIG. 11 the floor pan 80 is protected from the differential D and the drive shaft 30 and any heat generated thereat by a shield 20d protecting the floor pan 80 from any heat generated at the drive shaft or differential D located adjacent axle Ax.

Figure 12:
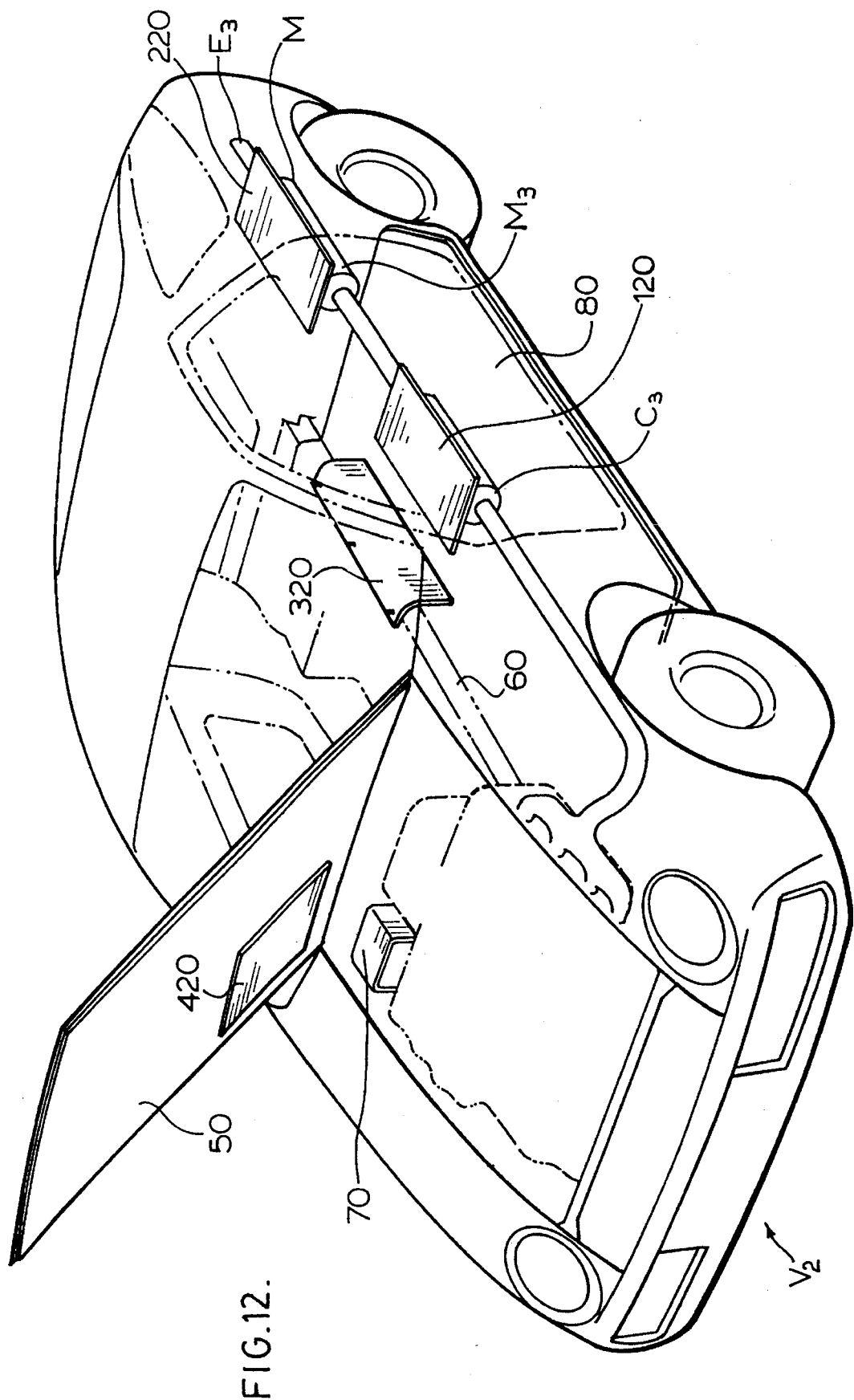
FIG. 12 is a perspective view of an automobile illustrated in an alternative embodiment of the invention indicating several typical heat management zones in automobiles wherein the instant invention finds particular use.

Referring now to FIG. 12 there is illustrated a vehicle generally seen as V2 having a floor pan 80 made of sheet molding compound in one piece and having formed as part of the floor pan at heat sensitive zones 120, 220 and 320, which are zones requiring heat management because of a catalytic converter C3, a muffler M, an exhaust E3 and a drive shaft 60 respectively. The pan 80 therefore is formed from sheet molding compound having the attributes described above and has heat management zones defined within the pan at 120, 220, and 320 formed as illustrated and described in relation to FIGS. 8 and 9. Therefore a heat shield may be provided as integral with a floor pan providing protection in only those zones where a heat source may be located adjacent thereto. As an alternative example for underhood applications the heat shield 420 may be provided adjacent a Turbo charger 70 to protect the hood 50 from melting if the hood were made from plastic materials.

It is therefore considered a part of this invention that a heat management zone be provided with a matrix which may be used as a heat shield to protect the heat sensitive device, or personnel from the effects of the heat source.

As many changes can be made to preferred and alternative embodiments of the invention without departing from the scope of the invention; it is intended that all material contained herein be interpreted as illustrative of the invention and not in a limiting sense.

What is claimed is:

1. A composite protective shield installed with a vehicle for protecting a destructible apparatus affected by the elements, the composite shield comprising mounting means to mount the shield adjacent the destructible apparatus and mounted at a gap therefrom, which may be an air gap or said gap may be filled with insulation, the shield being formed from a resilient sheet matrix of flame retardant phenolic or polyester glass fibre resin compound providing the form thereof, the resilient sheet matrix having predetermined heat distortion properties and abrasive resistance properties to provide maximum shielding from heat and abrasion, the resilient sheet matrix of the shield having raised portions formed with the shield raised laterally inwardly toward the destructible apparatus and which raised portions establish the gap between the shield and the destructible apparatus when the shield is installed with the destructible apparatus, the Shield being provided with a heat management system adjacent the destructible apparatus, the heat management system for dissipating the heat on the side of the shield to which heat may be applied opposite the destructible apparatus thus maintaining the destructible apparatus harmless and safe, wherein the heat management system further comprises a layer of reflective material fastened to the sheet matrix, the sheet matrix and the reflective material having therebetween disposed at least adjacent the the destructible apparatus insulating material having low thermal conductivity and low heat storage capability.

2. The shield of claim 1 wherein the shield is an integral part of the floor pan or fire wall.

3. The shield of claim 1 wherein the apparatus is a fuel tank, muffler or catalytic converter.

4. The shield of claim 1 wherein the elements are abrasive road wear and heat.

5. The shield of claim 1 or 3 wherein the resilient matrix is formed by compression molding.

6. The shield of claim 1 wherein the insulating material is ceramic wool, rock wool or Kaolin wool.

7. The shield of claim 6 wherein the reflective material is aluminum.

8. A composite protective shield installed with a vehicle for protecting a destructible apparatus affected by the elements, the composite shield comprising mounting means to mount the shield adjacent the destructible apparatus, and mounted at a gap therefrom, which may be an air gap or said gap may be filled with insulation, the shield being formed from a resilient sheet matrix of flame retardant phenolic or polyester glass fibre resin compound providing the form thereof, the resilient sheet matrix having predetermined heat distortion properties and abrasive resistance properties for providing maximum shielding from heat and abrasion, the resilient sheet matrix of the shield having raised portions formed with the shield raised laterally inwardly toward the destructible apparatus and which raised portions establish the gap between the shield and the destructible apparatus when the shield is installed with the destructible apparatus, the shield being provided with a layer of reflective material fastened to the matrix, the sheet matrix and the reflective material having therebetween disposed at least adjacent the the destructible apparatus insulating material having low thermal conductivity and low heat storage capability, the layer of reflective material and the insulating material for dissipating the heat on the side of the shield opposite the destructible apparatus to which heat may be applied thus maintaining the destructible apparatus harmless and safe.

9. The shield of claim 8 wherein the apparatus is a fuel tank.

10. The shield of claim 8 or 9 wherein the elements are abrasive road wear and heat.

11. The shield of claim 8 or 9 wherein the resilient matrix is formed by compression molding.

12. The shield of claim 8 or 9 wherein the reflective layer is aluminum.

13. The shield of claim 8 or 9 wherein the insulation is ceramic wool, rock wool, or Kaolin wool.

14. A composite protective shield installed with a vehicle for protecting a fuel tank affected by the elements, (for example abrasive road wear and heat), the composite shield comprising mounting means to mount the shield adjacent the fuel tank and mounted at a gap therefrom, which may be an air gap or said gap may be filled with insulation, the shield being formed from a resilient sheet matrix of flame retardant phenolic or polyester glass fibre resin compound, providing the form thereof, the resin compound having predetermined heat distortion properties and abrasive resistance properties to provide maximum shielding from heat and abrasion, the resilient sheet matrix of the shield having raised portions formed with the shield raised laterally inwardly toward the fuel tank and which raised portions establish the gap between the shield and the fuel tank when the shield is installed with the fuel tank, the shield being provided with a layer of reflective material fastened to the sheet matrix remote the fuel tank, the sheet matrix and the reflective material having therebetween disposed at least adjacent the fuel tank insulating material having low thermal conductivity and low heat storage capability, the layer of reflective material and the insulating material for dissipating the heat on the side of the shield opposite the fuel tank to which heat may be applied thus maintaining the fuel tank harmless and safe.

15. The shield of claim 14 wherein the reflective material is aluminum.

16. The shield of claim 14 or 15 wherein the insulation is ceramic wool, rock wool or Kaolin wool.

* * * * *